US009330709B2

(12) United States Patent
Morrison et al.

(10) Patent No.: US 9,330,709 B2
(45) Date of Patent: May 3, 2016

(54) TAPE LIBRARY STRING REQUEST MANAGEMENT

(75) Inventors: John C. Morrison, Boulder, CO (US);
Alexander E. Amador, Morrison, CO (US); Dennis J. Preston, Broomfield, CO (US); Richard L. Gonzalez, Parker, CO (US)

(73) Assignee: Oracle International Corporation, Redwood City, CA (US)

( * ) Notice: Subject to any disclaimer, the term of this patent is extended or adjusted under 35 U.S.C. 154(b) by 596 days.

(21) Appl. No.: 13/547,539

(22) Filed: Jul. 12, 2012

(65) Prior Publication Data

US 2014/0016227 A1    Jan. 16, 2014

(51) Int. Cl.
*G06F 15/16* (2006.01)
*G11B 15/68* (2006.01)
*G06F 3/06* (2006.01)

(52) U.S. Cl.
CPC ............ *G11B 15/689* (2013.01); *G06F 3/0611* (2013.01); *G06F 3/0635* (2013.01); *G06F 3/0686* (2013.01)

(58) Field of Classification Search
CPC ... H04L 7/1097; H04L 7/16; H04L 2463/102; H04L 41/00; H04L 45/586; H04L 61/2007; G06F 11/0709; G06F 11/0781; G06F 11/3055; G06F 21/10; G06F 15/16; G01N 2015/149
USPC .......... 709/201–203, 217–219; 700/214–218, 700/248
See application file for complete search history.

(56) References Cited

U.S. PATENT DOCUMENTS

| 4,864,438 | A | * | 9/1989 | Munro | ............... G11B 15/6835 198/349.6 |
| 5,164,909 | A | | 11/1992 | Leonhardt et al. | |
| 6,059,509 | A | | 5/2000 | Ostwald | |
| 6,721,275 | B1 | * | 4/2004 | Rodeheffer et al. | .......... 370/238 |
| 6,779,077 | B1 | * | 8/2004 | Bakke | .................... G06F 3/0626 711/111 |
| 7,409,442 | B2 | | 8/2008 | Basham et al. | |
| 2006/0277354 | A1 | * | 12/2006 | Tomii | ................... G06F 11/2089 711/4 |
| 2009/0063686 | A1 | * | 3/2009 | Schmidt et al. | ............... 709/227 |
| 2010/0114361 | A1 | * | 5/2010 | Starr et al. | ..................... 700/214 |
| 2010/0254241 | A1 | * | 10/2010 | Aoki | ..................... G06F 3/0605 369/84 |
| 2012/0084500 | A1 | * | 4/2012 | Jesionowski | .................. 711/111 |
| 2012/0246340 | A1 | * | 9/2012 | Ross | ..................... H04L 45/308 709/244 |

* cited by examiner

*Primary Examiner* — Oscar Louie
*Assistant Examiner* — Da T Ton
(74) *Attorney, Agent, or Firm* — Marsh Fischmann & Breyfogle LLP; Jonathon A. Szumny (57) ABSTRACT

Systems and methods that dynamically distribute status, cartridge movement and other types of requests and communications from a library manager to one or more libraries of a library string based on target or subject libraries in the requests. Upon receiving and/or generating a request, the library manager determines whether active connections (e.g., control paths) are available from the library manager substantially directly to the subject libraries and then distributes the requests over such active connections when available. When such active connections are unavailable, the library manager may distribute such requests over active connections to non-subject libraries which may forward such requests to the subject libraries via an inter-library communication interconnect.

8 Claims, 3 Drawing Sheets

TAPE LIBRARY STRING REQUEST MANAGEMENT

BACKGROUND

1. Field of the Invention

The present invention generally relates to the management of connected tape libraries and, more particularly, to systems and methods that facilitate the transmission of requests (e.g., status requests, cartridge movement operations, and the like) from a library manager to the one or more tape libraries that are the subjects or targets of the requests.

2. Relevant Background

Businesses and other organizations rely on data processing systems to manage a wide range of internal and external functions, including accounting and inventory functions, data management functions, and many others. Many of these systems must be available to be accessed over local or wide-area data processing system networks, including both private networks and public networks such as the Internet.

Storage libraries are data processing systems often used by enterprises and the like to efficiently store and retrieve data from storage media. In the case of some storage libraries (e.g., tape libraries), the media are data cartridges (e.g., tape cartridges) that are typically stored and indexed within a set of storage arrays. When particular data is requested, a specialized robotic mechanism of the library finds the appropriate cartridge, removes the cartridge from its magazine, and carries the cartridge to a tape drive that is designed to receive the cartridge and read its contents. Some storage libraries have multiple drives that can operate concurrently to perform input/output (IO) operations on multiple cartridges.

One method of creating large tape libraries is to generate long library strings, or linear libraries, where the tape libraries (e.g., library frames) are added side by side. Each library has one or more accessors (e.g., robotic arm or the like) that can move cartridges from storage shelves to tape drives. The libraries in a string can exchange cartridges via pass-thru ports (PTPs), and this allows a tape cartridge to be moved among all of the libraries in a string. In response to a request to move a tape cartridge from a cell of one library to a tape drive of another library, for instance, the tape cartridge may be appropriately removed from its cell, passed through one or more PTPs until it reaches the destination library, and then eventually sent to a drive of the destination library (e.g., some of which may include the use of robotic arms elevators, and the like).

The string of libraries are typically communicatively interconnected to each other by any appropriate network or interconnect (e.g., an inter library communication (ILC) kit or the like) and to a library manager by a plurality of "connections" (e.g., control path(s)) between the library manager and each of the libraries). The library manager is typically implemented on a server that is accessible by any appropriate backup application or the like of a host or client device via a local area network (LAN), wide area network (WAN, e.g., via TCP/IP), and/or the like. For instance, Oracle's StorageTek Automated Cartridge System Library Software (ACSLS) Manager shares resources with any ACSLS-enabled application and allows one to manage multiple libraries (e.g., in relation to tape cartridge storage, tape cartridge retrieval, statuses and the like) from a single console (e.g., a web-based user interface). As another example, Oracle's StorageTek Host Software Component (HSC) provides centralized management of tape libraries in an IBM z/OS or Virtual Machine (VM) environment.

SUMMARY

Library managers send various types of messages or communications (e.g., requests, queries, and the like) to the libraries in a string as part of performing string management (e.g., auditing, reporting, cartridge movements, and the like). Such communications typically include at least one "target" or "subject" library (e.g., a module thereof) that is intended to ultimately process or address the communication and then return a response back to the library manager indicating whether or not the communication has been addressed, providing any appropriate metadata or other information, and the like.

One type of communication is a request to perform a cartridge movement from a first or "source" target library (e.g., the library where the tape cartridge is currently located) to a second or "destination" target library (e.g., the library where the tape cartridge is to be moved, which could be different from or the same as the source library) of the string. For instance, the source library could include a tape drive in which a particular tape cartridge is currently mounted while the destination library could include a magazine or storage cell into which the particular tape cartridge is to be moved to. As another example, the source library could include a magazine or storage cell in which a particular tape cartridge is currently mounted while the destination library could include a tape drive in which the particular tape cartridge is to be moved and then mounted. Another type of communication is a request for a status of a particular library, tape drives of the particular library, and/or the like (e.g., as part of a heartbeat request, a request from a user to provide a current available space of a library, and/or the like).

Current techniques for routing requests from a library manager to the various libraries of a string are problematic because they can introduce a number of inefficiencies in the tape string management, which limits the degree to which such requests and other communications can be efficiently processed. For instance, one current manner of routing requests includes necessarily sending all requests (i.e., regardless of the subject library or libraries of the request) over the same connection to the same library (e.g., unless the library is busy). This library then populates a queue of the library and processes or otherwise forwards the queued requests to the target library or libraries in the order the requests were queued or in other appropriate orders.

However, library queues can typically store or handle only a limited number of requests at any particular time. For instance, the queue of requests that any library can handle at one time is usually less than the number of concurrent requests that all libraries in a string can process. When the library thus begins receiving requests that cannot be queued (e.g., because the library's queue is full), the library bounces the requests back to the library manager, which often responds by resending the request back to the same library over the same connection. As a result, a possibly large number of requests being sent from the library manager to the same library and then bounced back to the library manager may ensue, thereby causing wasted network resources, inefficient processing of requests, and the like.

Even when the library is able to forward a queued request to the subject library that is to process the request (e.g., return its status), the library must forward the request to the subject library or libraries via the inter-library network. This can present other issues or problems such as consuming bandwidth and library resources (e.g., which could be used for requests involving the library initially receiving the requests as opposed to for other libraries), creating forwarding time delays, and the like. Also, completion responses from the subject library generally first must travel to the initial receiving library, which proceeds to return the same (assuming the initial receiving library is even operative) to the library manager, and this further wastes system resources.

Another current technique of routing requests between the library manager and the string involves distributing requests, regardless of the subject library or libraries of the requests, in a "round-robin" manner to the various libraries in succession. In the case of a four library string, for instance, the library manager distributes a first request to the first library, the second request to the second library, and so on until the last library (e.g., the fourth library) has received a request. At which point, the next request would again be distributed to the first library. As will be appreciated, this process can prematurely or unnecessarily fill up the queue of one or more of the libraries, which can result in potentially large numbers of the same requests being bounced back and forth between the library manager and the libraries. Furthermore, time delays, bandwidth usage, and library resource consumption can result during the steps of forwarding requests from a library in the round robin, receiving a particular request, forwarding the request to a different library in the string, and returning completion messages back to the library manager.

In this regard, systems and methods are disclosed herein that aim to reduce the degree to which requests (e.g., Host Library Interface (HLI) requests) and/or other communications sent from a library manager to libraries of a string unnecessarily fill library queues, inefficiently utilize network bandwidth, consume library resources, and the like. Broadly, the disclosed systems and methods serve to determine the subject or target library (or libraries) of a request (e.g., the library for which a status request is being made, the source and destination libraries of a cartridge movement request, and the like). The systems and methods then forward or otherwise send such requests substantially directly to the subject libraries over respective connections between the library manager and the subject libraries. In other words, instead of necessarily sending requests to the same library or to the libraries in a round robin format (e.g., in a manner that does not necessarily take into account the subject library or libraries of the requests), the present systems and methods serve to direct requests from a library manager to the library or libraries that will end up processing the requests (i.e., to the subject libraries of the requests) over respective connections between the library manager and such library(ies).

In one aspect, a method for distributing requests from a library manager to one or more tape libraries of a library string includes determining, from a request for receipt at a string of interconnected tape libraries, at least one target tape library of the string. In this method, the at least one target tape library is intended to address the request. The method also includes ascertaining whether at least one active connection between a library manager and the at least one target library is available. Additionally, the method includes distributing, from the library manager, the request to the library string based on the ascertaining.

For instance, when at least one active connection is ascertained to be available between the library manager and the at least one target tape library, the distributing may include sending the request to the at least one target tape library over the at least one active connection between the library string and the at least one target tape library. In one arrangement, at least one response may be received at the library manager from the at least one target tape library. In such cases, the response may indicate that the at least one target tape library has addressed the request (e.g., a tape cartridge has been moved from a source tape library to a destination tape library, the response includes the requested status information, and/or the like).

According to another aspect of the description, a tape library manager request distribution system is disclosed. The system includes a processing module and a memory module logically connected to the processing module having a set of computer readable instructions executable by the processing module. This causes the processing module to determine, from a request to be sent to a string of tape libraries, at least one target tape library of the string, where the at least one target tape library a) is intended to respond to a status inquiry in the request, or b) is a source or destination tape library of an intended tape cartridge movement from the source tape library to the destination tape library. The processing module also examines connections between a library manager and the library string. In some cases, each connection interconnects the library manager to a respective tape library in the library string. The set of computer readable instructions executable by the processing module are further executable by the processing module to send, from the library manager, the request to at least one of the tape libraries over its respective connection when the at least one tape library is ascertained to be the at least one target tape library and its respective connection is ascertained to be available.

In a further aspect, an automated cartridge library system is disclosed that includes a string of interconnected tape libraries, a server executing a library manager operable to manage the string, and a plurality of connections between the server and the string. Each connection interconnects the server to a respective tape library in the string, and the library manager sends requests to be addressed by certain ones of the tape libraries to the certain ones of the tape libraries over their respective connections.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein are systems and methods that aim to distribute various types of requests (e.g., status request, cartridge movement operations, and the like) from a library manager of a library string substantially directly to the subject library or libraries of the requests over active connection between the library manager and the subject library(ies). This limits the degree to which library queues are filled with non-related requests, network bandwidth and library resources are consumed, and the like. For instance, requests for a status of a particular library can be sent from the library manager substantially directly to the particular library over an active connection between the library manager and the particular library. As another example, requests for movement of a cartridge from a source library to a destination library of the string can be sent from the library manager substantially directly to the source library over an active connection between the library manager and the source library or, if necessary, from the library manager substantially directly to the destination library over an active connection between the library manager and the destination library.

In some cases, the active connections are not available between the library manager and the subject library, e.g., the library that is to process the request, such as the library from which a status is requested, the source library of a cartridge movement request such the library having a storage cell in which a particular tape cartridge is currently stored, the destination library of the cartridge movement request such as a library having a tape drive in which the particular tape cartridge is to be moved and mounted into, and/or the like. In these cases, the requests can be sent to non-subject libraries that may proceed to forward the requests to the subject library, e.g., over any appropriate inter-library communication network or the like, according to any appropriate protocol (e.g., based on the least recently used connection, based on proximity to the subject library(ies), and/or the like). In any case, completion responses can be generated and sent from the subject library(ies) over the active connections substantially directly back to the library manager and/or, in the event that such active connections are unavailable, to any appropriate non-subject library(ies) that may proceed to send such completion responses over active connections back to the library manager.

Figure 1:
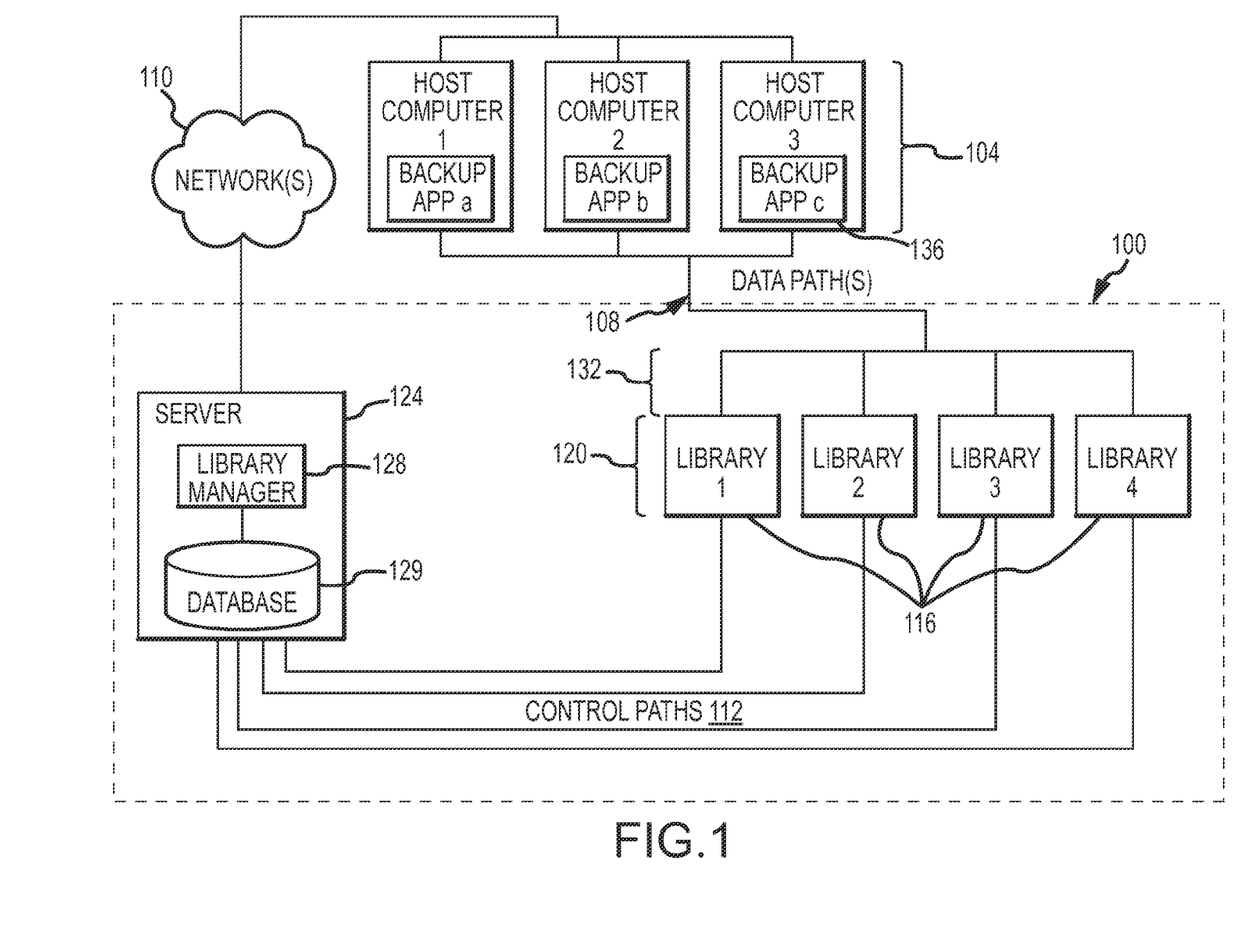
FIG. 1 is a block diagram illustrating control paths that allow a library manager to control tape libraries of a library string via one or more client devices and data paths that allow the client devices to read data from and/or write data to one or more tape cartridges of the tape libraries.

With initial reference to FIG. 1, a simplified block diagram is provided of an arrangement including a plurality of host computers 104 interconnected to an automated cartridge library system 100, where the arrangement is operable to implement the teachings presented herein. The automated cartridge library system 100 may broadly include a plurality of interconnected media libraries 116 (e.g., homogeneous or heterogeneous) collectively in the form of a library string 120 along with a library server 124 executing a library manager 128 (e.g., including any appropriate logic or software) that is operable to manage the library string 120 (e.g., in relation to cartridge movement requests, status requests, and/or the like).

Each library 116 may generally include or store (e.g., in bays, magazines, or storage cells, not shown) a plurality of media elements such as magnetic tape cartridges (not shown), a plurality of media drive systems such as tape drives (not shown) that allow host computers 104 to read data from and/or write data to the tape cartridges, and a plurality of accessors (e.g., robotic arms, not shown) operable to transfer tape cartridges between their storage cells and the tape drives (residing in either the same or a different tape library 116) and/or between respective tape libraries 116 in the string 120. To break down the numerous tape cartridges, tape drives, and the like of each library 116 into units that are more manageable by the library manager 128, each library 116 may include a plurality of "library storage modules" (LSMs) (not shown in FIG. 1, but shown in FIG. 2). The LSMs each include a subset of the total number of tape cartridges, tape drives, and the like of the library 116. For instance, each LSM may form a particular rail of a storage library 116. Any appropriate interconnect 132 (e.g., ILC kit or the like) may interconnect each library 116 to each of the other libraries to facilitate inter-library requests and other types of communications.

The library manager 128 generally functions as a central service provider and a central point of control for the library string 120 (even when the library string 120 is made up of a number of disparate or application-dedicated libraries 116). The library manager 128 is accessible over network(s) 110 (e.g., LAN, WAN) via any appropriate backup application 136 or the like running on any appropriate operating system on one or more of the host computers 104. In operation, a user connected to one of the host computers 104 may utilize a backup application 136 to send a request to the library manager 128 to access a particular data file in the library string 120 (or request that a particular data file be written to the library string 120). The request is typically translated (e.g., via backup application 136 and/or library manager 128) into an identification of a particular media element (e.g., tape cartridge) which contains and/or will store the particular data file, the library 116 in which the tape cartridge is located, an identification of the particular tape drive that will read data from and/or write data to the tape cartridge, and/or the like.

In any case, the library manager 128 may then send one or more requests to the library string 120 via one or more control paths 112 (e.g., connections) between the server 124 and each of the libraries 116 to allow for the desired data read and/or write. For instance, imagine the library manager 128 sends or distributes one or more requests to the library string 120 to retrieve (e.g., via a robotic arm) a particular tape cartridge from an LSM of "Library$_2$" 116 and pass the particular tape cartridge (e.g., via pass-through ports) to a tape drive in an LSM of "Library$_4$" 116 (e.g., in the event that all the tape drives in Library$_2$ 116 were being used or were otherwise unavailable). Upon receiving a message or response at the library manager 128 from the library string 116 indicating completion of the tape cartridge movement, the library manager 128 may signal the requesting backup application 136. The backup application then may proceed to implement the data read and/or write of the tape cartridge via data path 108, which may be part of the same physical network (e.g., storage area network (SAN)) or part of different networks.

As another example, imagine the library manager 128 sends a request to library string 120 via control path 112 for a status (e.g., online/offline, storage space, number of loaded tape cartridges, and/or the like) of "Library$_3$" 116 (and/or its LSMs, tape drives, and/or the like). Upon determining its status, Library$_3$ 116 may then return its status in a response message to the library manager 128 via a respective control path 112 between Library$_3$ 116 and the library manager 128 (where the library manager 128 may proceed to appropriately update a database 129, signal a particular backup application 136, and/or the like). In some arrangements, more than one library manager 128 may have access to the library string 120 for performing management of the library string 120. For instance, one library manager 128 may be configured to manage some types of LSMs, tape cartridges, and/or the like while another library manager 128 may be configured to manager other types of LSMs, tape cartridges, and/or the like.

Regardless of type, each request may include, inter alia, one or more "subject" IDs identifying the library 116, LSM, and/or the like that is to ultimately process and/or respond to the request (e.g., the library or LSM for which a status request is being made, the source and destination libraries or LSMs of a cartridge movement request, and/or the like). In one arrangement, the libraries 116 shown in FIG. 1 could have respective IDs such as $LIBID_1$, $LIBID_2$, $LIBID_3$ and $LIBID_4$ while their respective LSMs could have IDs such as $LSMID_0$, $LSMID_1$, and so on, all of which may be appropriately maintained in server database 129, among other locations (e.g., in each of the libraries 116 for use in performing inter-node communications and/or the like). In the previous example involving moving a tape cartridge from $Library_2$ 116 to a tape drive of $Library_4$ 116, the request could associate a "source" of the cartridge movement request with $LIBID_2$ (and/or a particular LSMID of $LIBID_2$) and a "destination" of the cartridge movement request with $LIBID_4$ (and/or a particular LSMID of $LIBID_4$). In the event that the request is for processing by all of the libraries 116 of the library string 120 (e.g., in the case of a request for a status of all of the libraries 116), the request may include any appropriate ID indicating as much (e.g., "$LIBID_0$" or the like). Additionally, each request includes any appropriate objects indicating the purpose of the request (e.g., perform a cartridge movement, return a status, and/or the like), other metadata, and/or the like.

As discussed previously, current methods of distributing requests (e.g., in relation to statuses, cartridge movements, and/or the like) from a library manager to a library string are static in the sense that such requests are either sent to the same library (regardless of the subject library) which proceeds to forward such requests to the subject library(ies) or sent to the libraries in a round-robin format (regardless of the subject library(ies)) which proceed to forward such requests to the subject library(ies). However, such static distribution of requests results in a number of inefficiencies such as unnecessarily filled library queues, wasted library resources and network bandwidth, and the like.

In this regard, the present disclosure involves dynamically distributing requests from the library manager 128 to the library string 120 based on the subject or target IDs (e.g., subject library, LSM, and/or the like) of the particular request. More specifically, the teachings presented herein involve determining (e.g., by the library manager 128 or other module) one or more subject IDs of a request and then sending the request over a particular control path 112 based on the one or more subject IDs (i.e., as opposed to sending a request over a control path 112 to a library 116 without regard to whether or not the library at the end of the control path 112 is the subject library or not).

Figure 2:
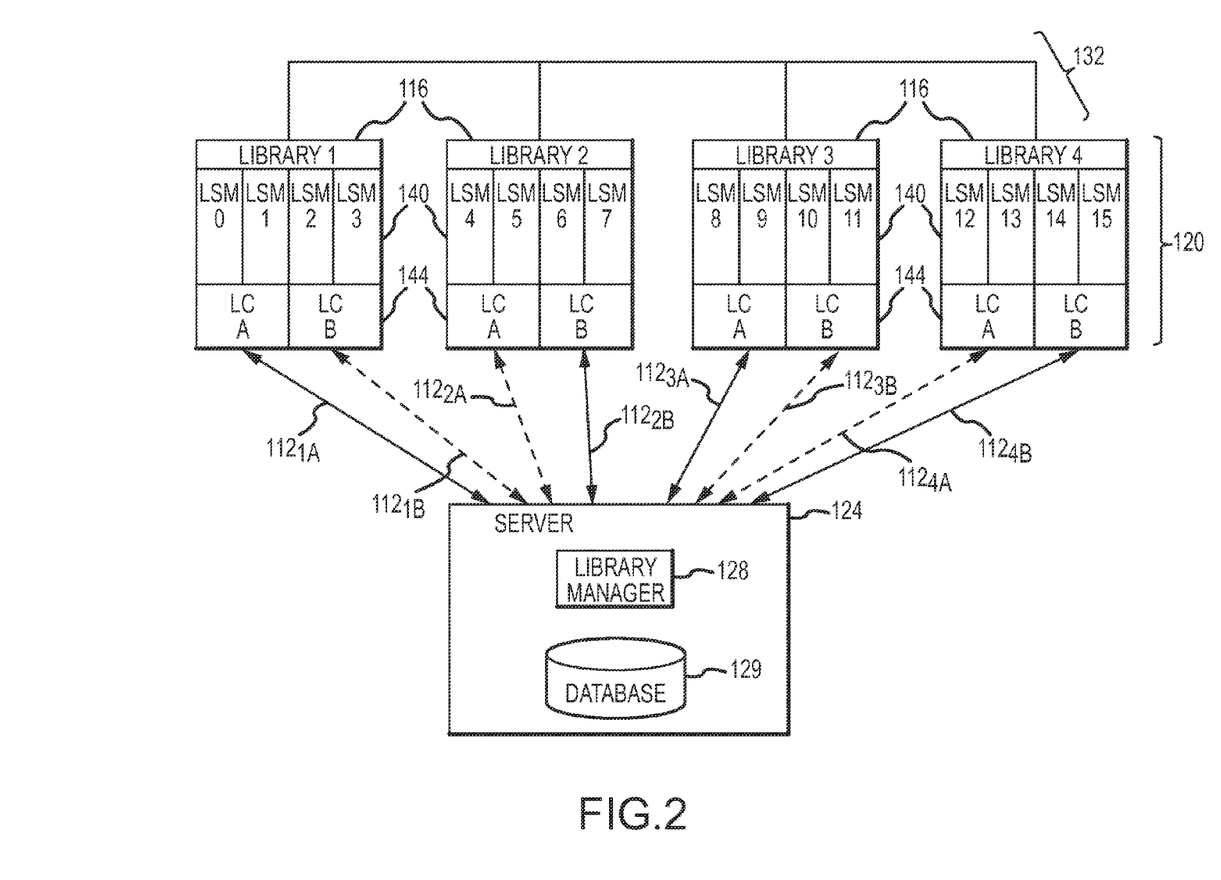
FIG. 2 is a block diagram illustrating various active and non-active connections between the library manager of FIG. 1 and each of the tape libraries.

Turning now to FIG. 2, a more detailed block diagram is provided that illustrates respective control paths 112 (e.g., connections) between the library manager 128 and each of the tape libraries 116 of the library string 120 of FIG. 1. According to the layout of FIG. 2, the library manager 128 may distribute received or generated requests substantially directly to particular libraries 116 (that are determined to be the subject or target libraries) via respective control paths 112 between the library manager 128 (or server 124) and the particular libraries 116 to reduce the degree to which a library's request queue fills up, library resources and bandwidth are wasted, and the like as will be discussed in more detail below. As shown, each library 116 may include a number of LSMs 140 (e.g., $LSM_0$-$LSM_3$ 140 for $Library_1$ 116, $LSM_4$-$LSM_7$ 140 for $Library_2$ 116, and so on). Each LSM 140 may include a plurality of storage cells or magazines, tape cartridges, tape drives, robotic arms, and the like. Furthermore, each library 116 may include one or more library controllers (LC) 144 (e.g., network interface controllers (NICs)) that facilitate communications between the library 116 (e.g., the LSMs 140 of the library 116) and the library manager 128.

In one arrangement, the respective control paths 112 may be formed by respective network cables (e.g., Ethernet cables) interconnected between a particular LC 144 and the server 124 of the library manager 128. For example, a first end of a cable is received in a port of the LC 144 and the second end of the cable is received in a port of the server 124 (or an NIC of the server 124). In another arrangement, each control path 112 may be formed at least in part by any appropriate network. As shown, each library 116 may include a pair of LCs 144 (e.g., $LC_A$, $LC_B$). Each LC 144 may be interconnected to a respective control path (e.g., control paths $112_{1A}$, $112_{1B}$ for $Library_1$ 116, control paths $112_{2A}$, $112_{2B}$ for $Library_2$ 116, and so on) to provide redundancy in the event that one of the LCs 144 is busy, unavailable, and/or the like. For instance, the control paths 112 in FIG. 2 depicted in solid lines (e.g., $112_{1A}$, $112_{2B}$, $112_{3A}$, and $112_{4B}$) may represent active connections between the server 124 (and thus the library manager 128) and the libraries 116. In contrast, the control paths depicted in dotted lines (e.g., $112_{1B}$, $112_{2A}$, $112_{3B}$, and $112_{4A}$) may represent standby connections between the server 124 (and thus the library manager 128) and the libraries 116.

Figure 3:
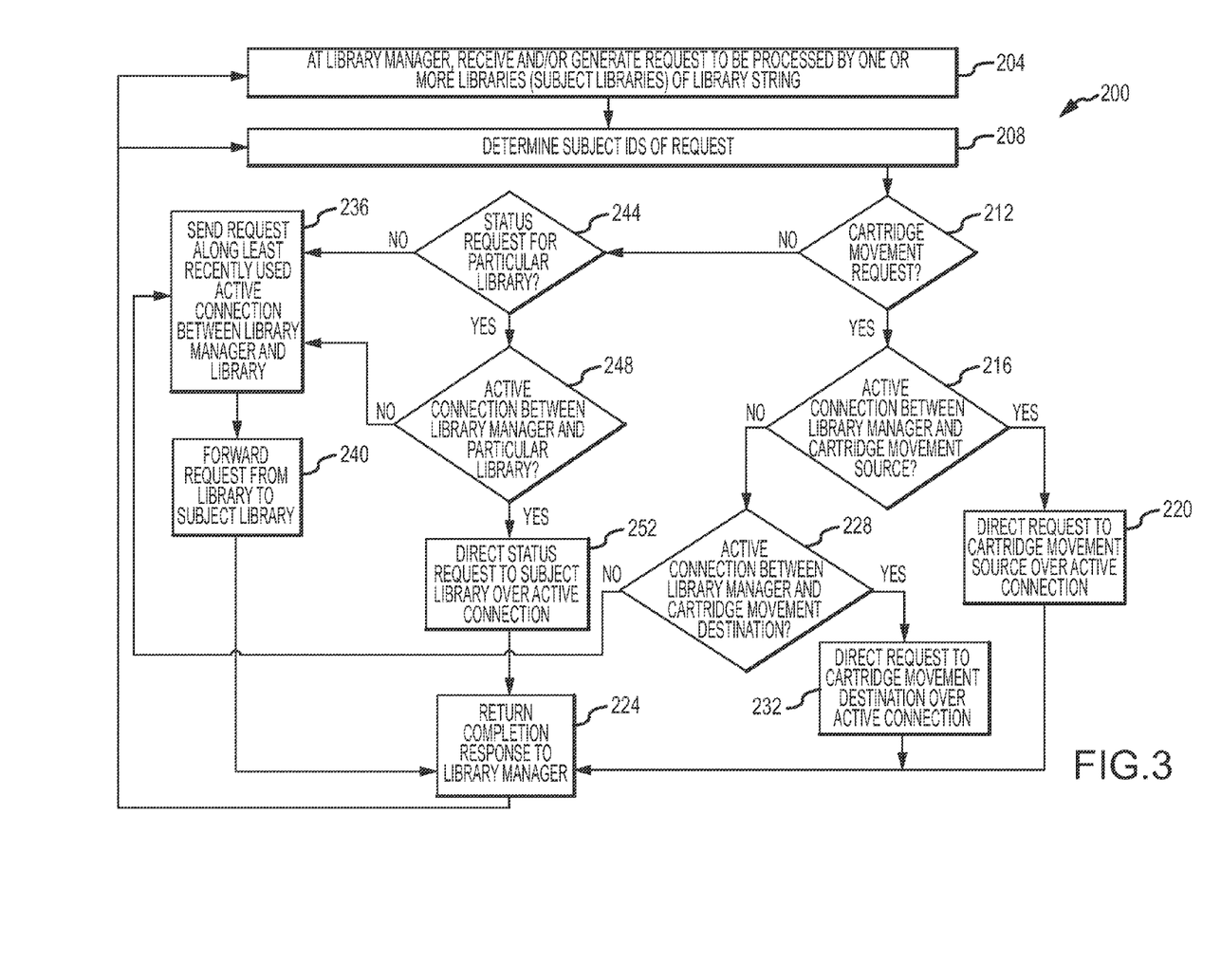
FIG. 3 is a flow diagram illustrating a method of receiving and efficiently distributing requests from the library manager of FIG. 2 to the tape libraries of the library string based upon the subject libraries of the requests.

To facilitate the reader's understanding of how status, cartridge movement, and other types of library requests may be dynamically distributed from a library manager to one or more libraries of a library string in accordance with the teachings presented herein, reference is now made to FIG. 3. In FIG. 3, a method 200 is shown for receiving and efficiently distributing requests from a library manager to one or more tape libraries of a library string based upon the subject libraries of the requests. In conjunction with a discussion of the method 200 of FIG. 3, reference will also be made to the block diagram of FIG. 2. While one arrangement of steps will be discussed in the method 200 of FIG. 3, it is to be understood that the present teachings are in no way limited to the specific arrangement of steps shown in FIG. 3 and described herein and that other arrangements are envisioned and encompassed herein. Furthermore, additional or fewer steps may also be included in the method 200.

At 204 in the method 200 of FIG. 3, a request to be processed by at least one subject library 116 may be received and/or generated 204 at the library manager 128, whereupon the library manager 128 may determine 208 at least one subject ID of the request (e.g., the ID(s) associated with the library, LSM, etc. that is/are the target of the request). At 212, the method 200 may query whether the received request is a cartridge movement request. For instance, and in relation to a previous example, imagine the library manager 128 receives or generates a request to retrieve a particular tape cartridge from $LSM_5$ 140 (e.g., identified by $LSMID_5$) of "$Library_2$" 116 (e.g. identified by $LIBID_2$) and pass the particular tape cartridge (e.g., via pass-through ports) to a tape drive in $LSM_{14}$ 140 (e.g., identified by $LSMID_{14}$) of "$Library_4$" 116 (e.g., identified by $LIBID_4$).

In response to it being determined at 212 that the request is a cartridge movement request, the method 200 may query 216 whether an active connection exists between the library manager and the cartridge movement source. Continuing with the above example, the library manager 128 may obtain $LSMID_5$ and/or LIBID$_2$ (e.g., IDs associated with the current source of the tape cartridge) and determine that an active connection exists along control path 112$_{2B}$ to LC$_B$ 144 of Library$_2$ 116 and thus LSM$_5$ 140. For instance, the library manager 129 may maintain any appropriate table (not shown) in database 129 of IDs (e.g., LIBIDs, LSMIDs, and the like) and corresponding control paths 112 (e.g., LSMID$_5$ and LIBID$_2$ may be linked to or otherwise associated with control paths 112$_{2A}$ and 112$_{2B}$). Thereafter, the method 200 (e.g., the library manager 128) may proceed to direct 220 the request to the cartridge movement source (e.g., to LSM$_5$ 140) over the active connection (e.g., along control path 112$_{2B}$). The particular LSM 140 (e.g., LSM$_5$ 140) may then communicate with the cartridge movement destination (e.g., with LSM$_{14}$ 140 of Library$_4$ 116 via interconnect 132 to execute the cartridge movement.

Returning to step 216, in the case where the library manager 128 or the like determines that an active connection does not exist between the library manager 128 and the cartridge movement source, the method 200 may proceed to make a similar inquiry 228 with respect to the cartridge movement destination. For instance, in the event that the library manager 128 determines that an active connection exists between the library manager 128 and the cartridge movement destination (e.g., along control path 112$_{4B}$), the method 200 (e.g., library manager 128) may proceed to direct 232 the request to the cartridge movement destination (e.g., to LSM$_{14}$ 140) over the active connection (e.g., along control path 112$_{4B}$) which may proceed to communicate with the cartridge movement source (e.g., LSM$_5$ 140) via interconnect 132 to execute the cartridge movement.

Upon completion of the particular cartridge movement, the cartridge movement source (e.g., LSM$_5$ 140) and/or the cartridge movement destination (e.g., LSM$_{14}$ 140) may return 224 a completion confirmation message or the like back to the library manager 128 over an active connection between the source (e.g., control path 112$_{2B}$, or, in the event that control path 112$_{2B}$ is unavailable, via control path 112$_{2A}$) and the server 124 of the library manager 128 and/or between the destination (e.g., control path 112$_{4B}$, or, in the event that control path 112$_{4B}$ is unavailable, via control path 112$_{4A}$) and the server 124 of the library manager 128 (where the library manager 128 may proceed to appropriately update database 129 with IDs, metadata and/or the like from the completion message). In some arrangements when no active connections are available between the subject libraries 116 and the library manager 128, the completion messages may be passed (e.g., via interconnect 132) to a non-subject library 116 (e.g., associated with a least-recently used active connection or control path 112) which may forward the completion message over such a control path 112 back to the library manager 128. The method 200 may then return to 204 and/or 208 to again receive requests and/or determine subject IDs to dynamically distribute such requests substantially directly to corresponding subject libraries 116.

Returning to step 228, in the event that active connections do not exist between the library manager 128 and either of the source or destination of the cartridge movement, the method 200 may proceed to send 236 the request along the least recently used active connection between the library manager 128 and a non-subject library 116. This limits the chances the request will completely fill the request queue of the non-subject library 116. Upon receipt, the non-subject library 116 may proceed to forward 240 the request (e.g., via interconnect 132) to the subject library(ies) 116 for processing. For instance, in the case where control paths 112$_{2A}$, 112$_{2B}$, 112$_{4A}$ and 112$_{4B}$ were all unavailable, the library manager 128 may direct the request over another of the control paths 112 (that is determined to be active) to another library 116 which may then forward the request to the subject library(ies) 116 (e.g., to Library$_2$ 116 and/or Library$_4$ 116).

Upon determining that the request has been appropriately processed, any appropriate completion message may be returned 224 over an active connection (e.g., control paths 112$_{2A}$, 112$_{2B}$, 112$_{4A}$ and/or 112$_{4B}$) between the subject library(ies) 116 and the library manager 128 (or over other active connections in the event none currently exist between the subject library(ies) 116 and the library manager 128). The method 200 may then return to 204 and/or 208 to again receive requests and/or determine subject IDs to dynamically distribute such requests substantially directly to corresponding subject libraries 116.

Returning to step 212, in the event that it is determined that the request is not a cartridge movement request, the method 200 may query 244 whether the request is a status request for a particular library 116. For instance, the library manager 128 may generate and/or receive a request for a status (e.g., available storage capacity, offline, and/or the like) of LSM$_8$ 140 of Library$_3$ 116. The method 200 (e.g., the library manager 128) may then determine 248 whether an active connection exists (e.g., via control path 112$_{3A}$) between the library manager 128 and the subject library 116 (e.g., Library$_3$ 116) and then direct 252 the request to the subject LSM 140 (e.g., LSM$_8$ 140) over the active connection (e.g., over control path 112$_{3A}$). A completion message may be returned 224 as discussed above. The method 200 may then return to 204 and/or 208 to again receive requests and/or determine subject IDs to dynamically distribute such requests substantially directly to corresponding subject libraries 116. When it is determined at 248 that one or more active connections do not exist between the library manager 128 and the subject library 116 for which a status is requested, the method 200 may flow to step 236. At step 236, the method 200 includes directing the status request to non-subject libraries 116 which may proceed to forward 240 such requests to the subject libraries 116. Then, the method 200 may return 224 completion messages and then return to steps 204 and/or 208, all as discussed previously.

When it is determined that the request is not a cartridge movement request or status request involving one or more particular libraries at 212 and 244 (e.g., the request includes an ID of "LIBID$_0$"), respectively, the method 200 may flow to step 236 to send the request along a least recently used connection (e.g., least recently used control path 112) to one or more libraries 116 for processing. For instance, imagine a request is generated for a status of all the libraries 116 (e.g., and/or their LSMs 140) in the library string 120. In this case, the library manager 128 could forward the request to one of the libraries 116 along a least-recently used control path 112. This library 116 could then, in addition to determining its own status, forward 240 the request to the other libraries 116 for processing. Again, completion messages may be returned at step 224, and then the method 200 may flow back to steps 204 and/or 208 as discussed previously.

It will be readily appreciated that many additions and/or deviations may be made from the specific embodiments disclosed in the specification without departing from the spirit and scope of the invention. For instance, while the method 200 of FIG. 3 illustrates directing cartridge movement requests to the destination only after determining that active connections do not exist to the source, some embodiments envision vice versa whereby a cartridge movement request would first be directed to the destination and would only be directed to the source in the case where no active connections exist to the destination. Furthermore, some of the existing techniques of distributing requests can be incorporated into the present teachings as appropriate. For instance, the round robin approach could be implemented in the case where a request is to be processed by all of the libraries (e.g., in the case of a status request of the entire library string 120) and two or more control paths 112 continue to be the least recently used control paths. Still further, while the libraries 116 and their LSMs 140 have been numbered from left to right in FIGS. 1-2 (e.g., Library$_1$ 116, Library$_2$ 116, etc.; LSM$_0$ 140, LSM$_1$ 140, etc.), it is to be understood that in reality, the libraries 116 and their LSMs 140 may actually be numbered right to left (e.g., so that as one looks at FIGS. 1-2 starting on the left, the libraries are numbered Library$_4$ 116, Library$_3$ 116, etc. and the LSMs 140 are numbered LSM$_{15}$ 140, LSM$_{14}$ 140, etc.). In this case, the control paths 112 would also be correspondingly numbered (e.g., so that as one looks at FIGS. 1-2 starting on the left, the control paths 112 would be numbered 112$_{4A}$, 112$_{4B}$, and the like.

The illustrations and discussion herein has only been provided to assist the reader in understanding the various aspects of the present disclosure. Furthermore, one or more various combinations of the above discussed arrangements and embodiments are also envisioned. For instance, while the figures illustrate three host computers 104, four libraries 116, four LSMs 140 in each library 116, and the like, the present teachings may be equally applicable to other numbers and arrangements of the components (e.g., host computers 104, libraries 116, LSMs 140, etc.) disclosed herein.

Embodiments disclosed herein can be implemented as one or more computer program products, i.e., one or more modules of computer program instructions encoded on a computer-readable medium for execution by, or to control the operation of, data processing apparatus. For example, the logic or software of the library managers 128, backup applications 136 and/or processing modules (not shown) of the libraries 116 may be provided in such computer-readable medium of the server 124, host computers 104 and/or libraries 116 and executed by a corresponding processor or processing engine (not shown). The computer-readable medium can be a machine-readable storage device, a machine-readable storage substrate, a non-volatile memory device, a composition of matter affecting a machine-readable propagated signal, or a combination of one or more of them. In this regard, the server 124, host computers 104 and/or libraries 116 may encompass one or more apparatuses, devices, and machines for processing data, including by way of example a programmable processor, a computer, or multiple processors or computers. In addition to hardware, the server 124, host computers 104 and/or libraries 116 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., performing DR testing, and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A method for distributing requests from a library manager to one or more tape libraries of a library string, comprising:

determining, by a library manager from a request for movement of a tape cartridge from a source tape library of a string of interconnected tape libraries to a destination tape library of the string, an identifier (ID) of the source tape library;

ascertaining whether at least one active connection between the library manager and the source tape library is available, wherein at least one active connection is ascertained to be unavailable between the library manager and the source tape library;

finding, in response to the at least one active connection between the library manager and the source tape library being unavailable, at least one active connection between the library manager and another tape library of the string; and distributing, from the library manager, the request to the library string based on the ascertaining, wherein the distributing comprises sending the request to the another tape library over the at least one active connection between the library manager and the another tape library, wherein the another tape library is the destination tape library in the event at least one active connection is available between the library manager and the destination tape library, wherein the another tape library is a tape library other than the source and destination tape libraries in the event at least one active connection is unavailable between the tape library and the destination tape library, and wherein the another tape library uses the source tape library ID to forward the request to the source tape library via an inter-library interconnect that interconnects each tape library of the string of interconnected tape libraries to each of the other tape libraries of the string of interconnected tape libraries.

2. The method of claim 1, wherein the at least one active connection between the library manager and the tape library other than the source and destination tape libraries comprises a least recently used active connection among a plurality of active connections between the library manager and the tape libraries of the string.

3. The method of claim 1, further comprising before the determining:

receiving, at the library manager, the request from a host computer over at least one network.

4. The method of claim 1, further comprising before the determining:

generating, at the library manager, the request.

5. A tape library manager request distribution system, comprising:

a hardware processor; and a memory logically connected to the hardware processor and comprising a set of computer readable instructions executable by the hardware processor to:

determine, from a request for movement of a tape cartridge from a source tape library of a string of interconnected tape libraries to a destination tape library of the string, an identifier (ID) of the source tape library; and examine connections between a library manager and the library string, wherein each connection interconnects the library manager to a respective tape library in the library string, and wherein the set of computer readable instructions executable by the hardware processor to examine are further executable by the hardware processor to:

send, from the library manager, the request to library string, wherein the request is sent:

to the source tape library over its respective connection when its respective connection is ascertained to be available;

to the destination tape library over its respective connection when its connection is ascertained to be available and the connection between the library manager and the source tape library is ascertained to be unavailable, wherein the destination tape library uses the source tape library ID to forward the request to the source tape library via an inter-library interconnect that interconnects each tape library of the library string to each of the other tape libraries of the library string; and to a tape library of the library string other than the source tape library and the destination tape library ("another tape library") over the respective connection between the library manager and the another tape library when a) the respective connection between the library manager and the another tape library is ascertained to be available, b) the connection between the library manager and the source tape library is ascertained to be unavailable, and c) the connection between the library manager and the destination tape library is ascertained to be unavailable, wherein the another tape library uses the source tape library ID to forward the request to the source tape library via the inter-library interconnect:

receive, at the library manager, at least one response from the source tape library, wherein the at least one response indicates that the source tape library has addressed the request by confirming that the cartridge movement from the source tape library to the destination tape library has been completed.

6. The system of claim 5, wherein the respective connection to the another tape library is a least recently used connection among the connections between the library manager and the library string.

7. A tape library manager request distribution system, comprising:

a hardware processor; and a memory logically connected to the hardware processor and comprising a set of computer readable instructions executable by the hardware processor to:

determine, from a request for movement of a tape cartridge from a source tape library of a string of interconnected tape libraries to a destination tape library of the string, an identifier (ID) of the source tape library; and examine connections between a library manager and the library string, wherein each connection interconnects the library manager to a respective tape library in the library string, and wherein the set of computer readable instructions executable by the hardware processor to examine are further executable by the hardware processor to:

send, from the library manager, the request to library string, wherein the request is sent:

to the destination tape library over its respective connection when its respective connection is ascertained to be available, wherein the destination tape library uses the source tape library ID to forward the request to the source tape library via an inter-library interconnect that interconnects each tape library of the library string to each of the other tape libraries of the library string;

to the source tape library over its respective connection when its connection is ascertained to be available and the connection between the library manager and the destination tape library is ascertained to be unavailable; and to a tape library of the library string other than the destination tape library and the source tape library ("another tape library") over the respective connection between the library manager and the another tape library when a) the respective connection between the library manager and the another tape library is ascertained to be available, b) the connection between the library manager and the destination tape library is ascertained to be unavailable, and c) the connection between the library manager and the source tape library is ascertained to be unavailable, wherein the another tape library uses the source tape library ID to forward the request to the source tape library via the inter-library interconnect;

receive, at the library manager, at least one response from the source tape library, wherein the at least one response indicates that the source tape library has addressed the request by confirming that the cartridge movement from the source tape library to the destination tape library has been completed.

8. The system of claim 7, wherein the respective connection to the another tape library is a least recently used connection among the connections between the library manager and the library string.

* * * * *